H. J. BUCK.
GRAVITY CARRIER.
APPLICATION FILED FEB. 3, 1914.
1,226,182.
Patented May 15, 1917.
2 SHEETS—SHEET 2.
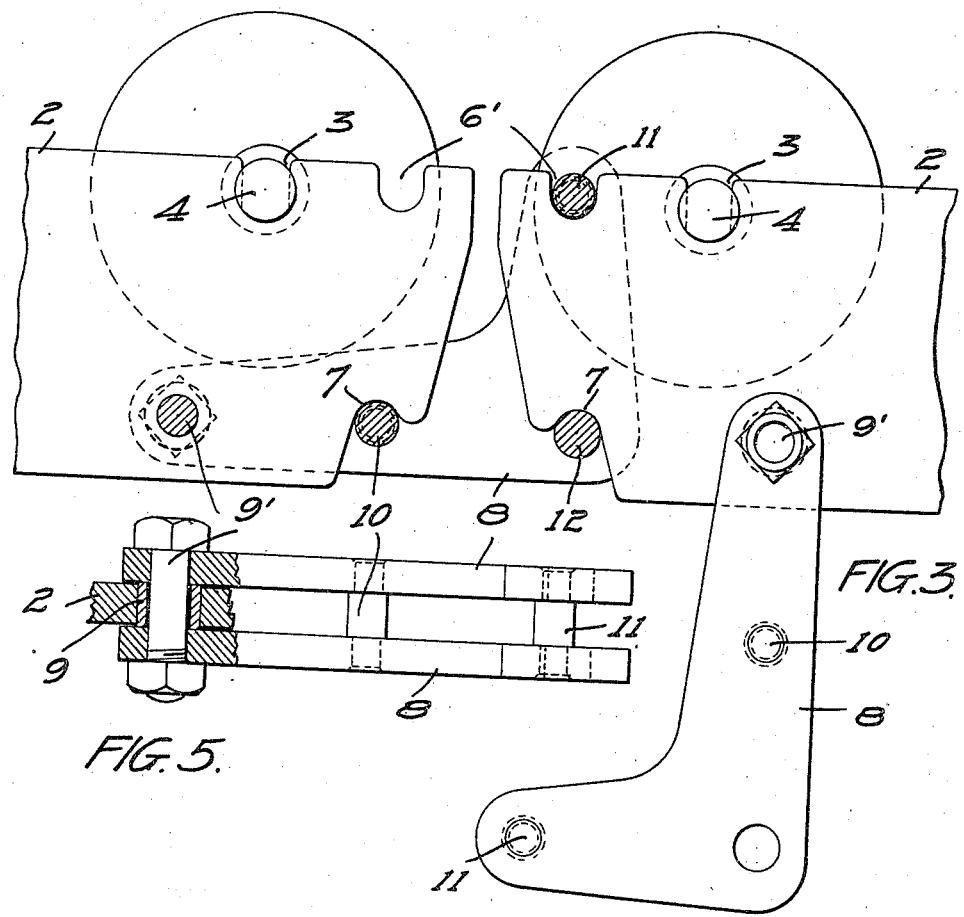
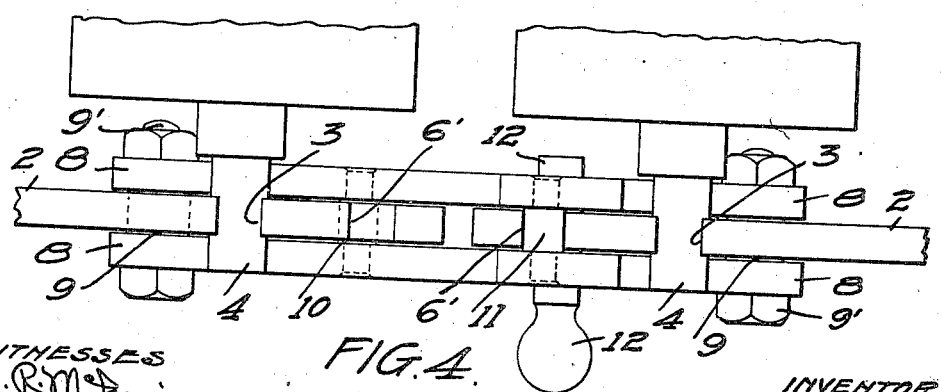
WITNESSES
INVENTOR
HERMAN J. BUCK
BY
ATTORNEYS

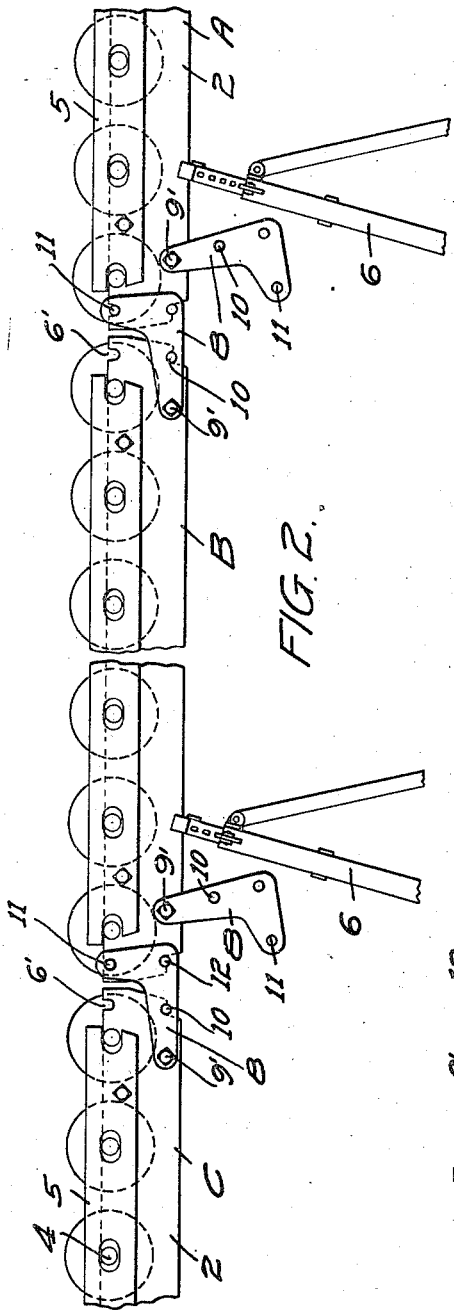
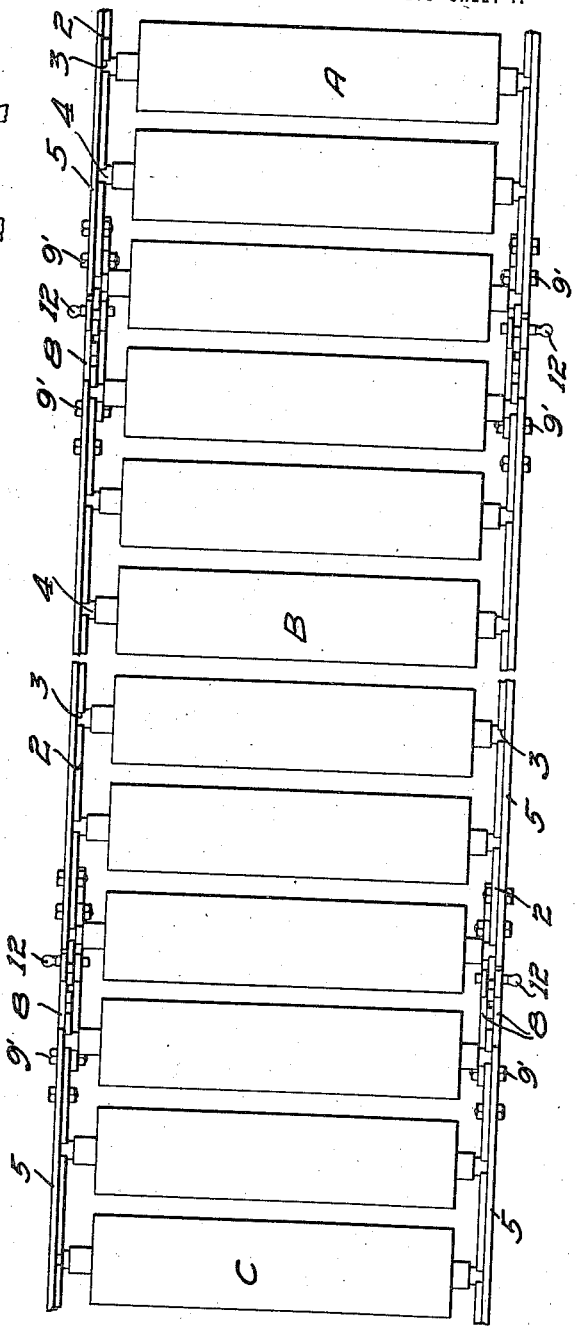

UNITED STATES PATENT OFFICE.

HERMAN J. BUCK, OF ELLWOOD CITY, PENNSYLVANIA, ASSIGNOR TO MATHEWS GRAVITY CARRIER COMPANY, OF ELLWOOD CITY, PENNSYLVANIA, A CORPORATION.

GRAVITY-CARRIER.

1,226,182.  Specification of Letters Patent.  Patented May 15, 1917.

Application filed February 3, 1914. Serial No. 816,141.

*To all whom it may concern:*

Be it known that I, HERMAN J. BUCK, a citizen of the United States, resident of Ellwood City, county of Lawrence, State of Pennsylvania, have invented certain new and useful Improvements in Gravity-Carriers, of which the following is a specification.

My invention relates to carriers for transporting articles from place to place and the object of the invention is to provide means for coupling the abutting ends of the carrier sections together.

A further object is to provide a coupling means which will render the carrier sections interchangeable and reversible, thereby avoiding all fitting and adjustments in assembling the sections of the carrier.

A further object is to provide a coupling of simple but strong and durable construction, and one which will enable the carrier sections to be easily and quickly joined together and as readily separated from one another.

The invention consists generally in various constructions and combination, all as hereinafter described and particularly pointed out in the claims.

Figure 1 is a plan view of portions of three sections of carrier with the abutting ends of the sections coupled together, Fig. 2 is a side elevation of the same, Fig. 3 is a detail view, partially in section, showing the manner of mounting the coupling links on the carrier rails, Fig. 4 is a plan view, showing the position of the coupling links with respect to the rails and carrier rolls, Fig. 5 is a detail view of one of the carrier links.

In the drawing, 2 represents the side rails of the carrier sections, which may be of any suitable construction. In the structure shown in the drawings these side rails are illustrated as having notches 3 in the upper edge to receive the rods 4, which connect the opposite rails at intervals and are secured in said notches by means of the locking bars 5. For convenience I have designated the sections shown in the drawings by the reference letters A, B and C. The carrier rails are usually supported at the desired elevation by suitable means, such as the trestles 6. The ends of the rails are preferably provided in their upper edges with notches 6' and the lower edges of the rails at the ends thereof are also preferably notched to form recesses 7.

The ends of the rails on both sides of the carrier are equipped with three notches and recesses and each rail on both sides of the carrier is provided with a coupling link comprising, preferably, substantially L-shaped plates 8 in parallel relation and preferably spaced apart by suitable means, such as the sleeve 9, sufficiently to receive the end of the carrier rail, and secured together, through said rail, by a pivot bolt 9', which passes through said sleeve. The middle portions of the long arms of each link are connected by a fixed pin 10, which, when the link is swung to a position on a level substantially with the carrier rail, will enter the notch in the lower edge of the rail and be seated in the recess therein. The short arms of the link are also provided with a fixed pin 11 adapted to enter the notch 6 in the upper edge of the abutting rail. A removable pin 12 may, when desired, be passed through the hole formed in the link plates at the angle of their long and short arms and be seated in the recess in the lower edge of the abutting rail. The pins 12 are generally used to lock the ends of the carrier sections together and hold them in alinement with one another, when curved and straight sections are coupled together. While the removable pins are not ordinarily employed when coupling straight sections together, they may be so employed if preferred.

When the coupling links of one carrier section are used to unite it to the adjoining section, the links of the adjoining section will be allowed to hang in a vertical, idle position, as indicated in Fig. 3, and whenever the location of the sections, or other circumstances, may make it advisable, these idle sections may be substituted as a locking means for connecting the abutting ends of the carrier sections together. Both ends of each section are equipped with the pivoted links, and slotted to receive the link pins, and it is therefore immaterial how the carrier sections are assembled.

Ordinarily when the pins 12 are not used the sections may be uncoupled by lifting the section to which the link then in use is permanently connected until its pins slide out of the notches in the rails of the adjoining section.

I preferably employ trestles 6 for holding up certain of the sections. Such trestles need not be employed for all sections. As shown in Fig. 2 the section A should be supported upon a trestle or other support 6, and this section will then support the right-hand end of section B. The left-hand end of section B supports the right-hand end of section C. By using the links on the left-hand end of section B for coupling sections B and C together, section B may be supported wholly from sections A and C. In this case the trestles or other supports are under sections A and C and no trestles or other supports need to be used under section B.

The details of the construction may be varied in many particulars without departing from my invention.

I claim as my invention,

1. In a gravity carrier, the combination with the abutting rails, of L-shaped links pivotally mounted on each end of each rail, and each rail having means at the end thereof, forming part of the rail itself, for interlocking with the short arm of the link on the adjacent end of the abutting rail.

2. In a gravity carrier, the combination with the abutting rails, of L-shaped links pivotally mounted on each end of each rail, each link comprising plates in parallel relation to each other and spaced apart to straddle the ends of each pair of abutting rails, each rail having means, forming part of the rail itself, for interlocking with the short arm of the link on the adjacent end of the abutting rail.

3. In a gravity carrier, the combination with the abutting rails, each provided with notches in its upper and lower edges and near the end thereof, of coupling links pivotally connected on the end of each rail, pins to enter the notches in the lower edge of the rail to which each link is pivoted, each link also having pins to enter the notches in the upper and lower edges of the abutting rail.

4. In a gravity carrier, the combination with abutting rails provided with notches in their upper and lower edges, of links pivotally mounted near the ends of said abutting rails, pins mounted in said links to enter respectively the notches in the lower edges of the rails to which said links are pivoted and the notches in the upper edges of the abutting rails and removable pins fitting within said links and the notches in the lower edges of the abutting rail.

In witness whereof, I have hereunto set my hand this 20 day of January, 1914.

HERMAN J. BUCK.

Witnesses:
 FRANK E. MOORE,
 JOS. W. HUMPHREY.